US011119058B2

(12) United States Patent
Safai

(10) Patent No.: US 11,119,058 B2
(45) Date of Patent: Sep. 14, 2021

(54) NON-DESTRUCTIVE INSPECTION METHODS, SYSTEMS AND APPARATUSES USING FOCUSABLE X-RAY BACKSCATTER DETECTORS

(71) Applicant: The Boeing Company, Chicago, IL (US)

(72) Inventor: Morteza Safai, Newcastle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/419,293

(22) Filed: May 22, 2019

(65) Prior Publication Data

US 2020/0371049 A1 Nov. 26, 2020

(51) Int. Cl.
*G01N 23/203* (2006.01)
*G01N 23/20008* (2018.01)

(52) U.S. Cl.
CPC ..... *G01N 23/20008* (2013.01); *G01N 23/203* (2013.01); *G01N 2223/316* (2013.01); *G01N 2223/401* (2013.01); *G01N 2223/505* (2013.01)

(58) Field of Classification Search
CPC .... G01V 5/0016; G01V 5/0025; G01N 23/18; G01N 23/20; G01N 23/203; G01N 23/20008; G01N 23/04; A61B 6/483
USPC ................... 378/57, 58, 62, 70, 86, 87, 184
See application file for complete search history.

(56) References Cited

U.S. PATENT DOCUMENTS

| 7,145,149 | B2 * | 12/2006 | Cooke | C09K 11/7774 |
| | | | | 250/361 R |
| 7,567,649 | B1 * | 7/2009 | Safai | G01T 1/24 |
| | | | | 250/370.09 |
| 8,503,610 | B1 * | 8/2013 | Safai | G01N 23/203 |
| | | | | 378/70 |
| 8,879,688 | B2 | 11/2014 | Safai | |
| 10,890,669 | B2 * | 1/2021 | Zhao | G01T 1/2018 |
| 2013/0315376 | A1 | 11/2013 | Safai | |
| 2018/0196147 | A1 * | 7/2018 | Kang | G01T 1/20 |

FOREIGN PATENT DOCUMENTS

WO 2012071118 A1 5/2012

OTHER PUBLICATIONS

Oliveira, J. et al., "Indirect X-ray detectors based on inkjet-printed photodetectors with a screen-printed scintillator layer", ACS Applied Materials & Interfaces, Mar. 2018, pp. 1-27, American Chemical Society.
Jung, P. et al., "Microdome-gooved Gd2O2S:Tb scintillator for flexible and high resolution digital radiography", Optics Express, Jul. 5, 2010, pp. 14850-14858, vol. 18, No. 14.
Oliveira, J. et al., "Water based scintillator ink for printed X-ray radiation detectors", Polymer Testing, 2018, pp. 26-31, vol. 69.

* cited by examiner

*Primary Examiner* — Jurie Yun
(74) *Attorney, Agent, or Firm* — Coats & Bennett, PLLC

(57) ABSTRACT

Methods, apparatuses, and systems are disclosed for generating X-ray backscatter images of a target by employing a flexible, deformable and flexible X-ray backscatter detector comprising a scintillating material layer comprising a scintillating jet print ink.

20 Claims, 4 Drawing Sheets

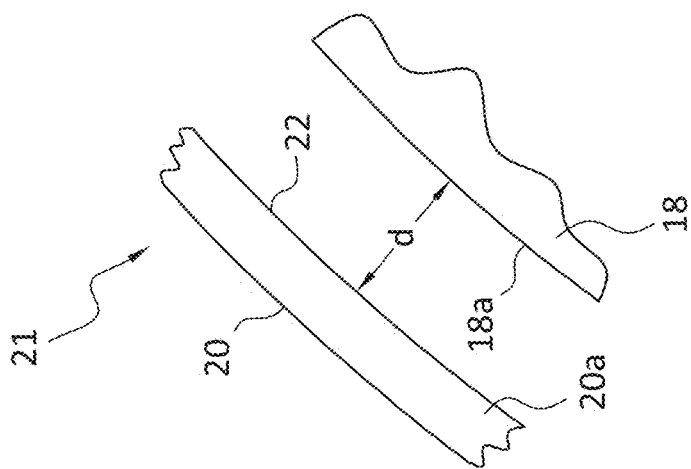
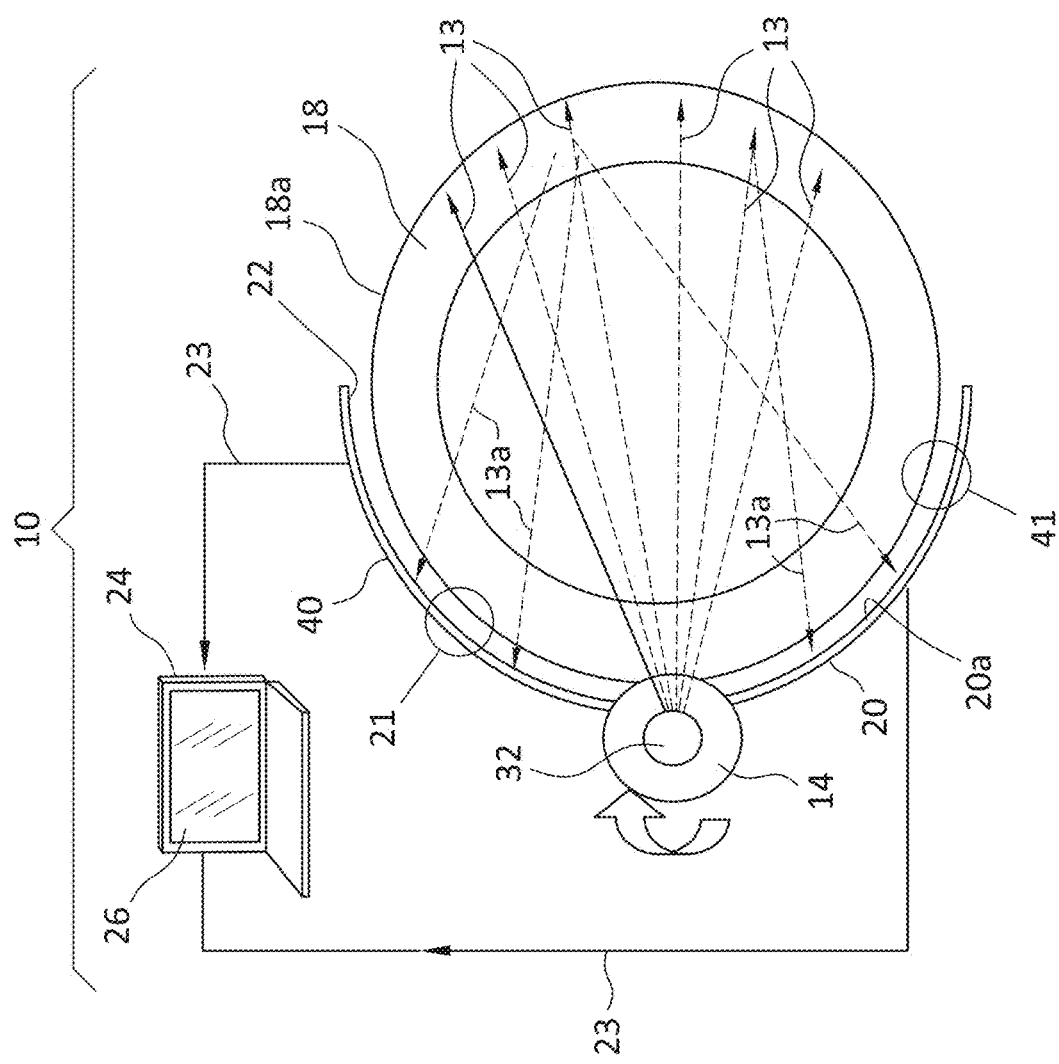
FIG. 1B
FIG. 1A

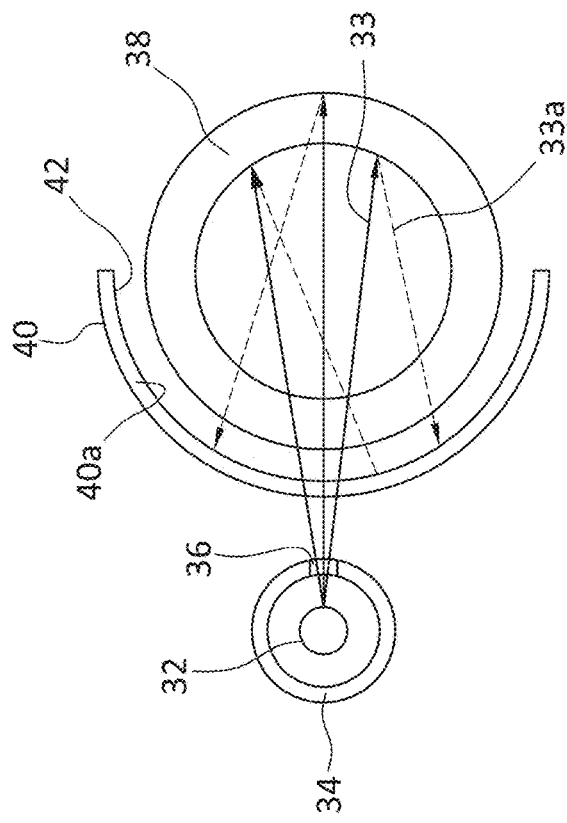
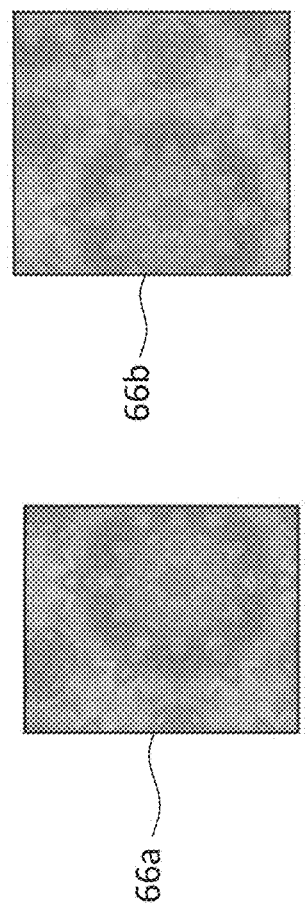
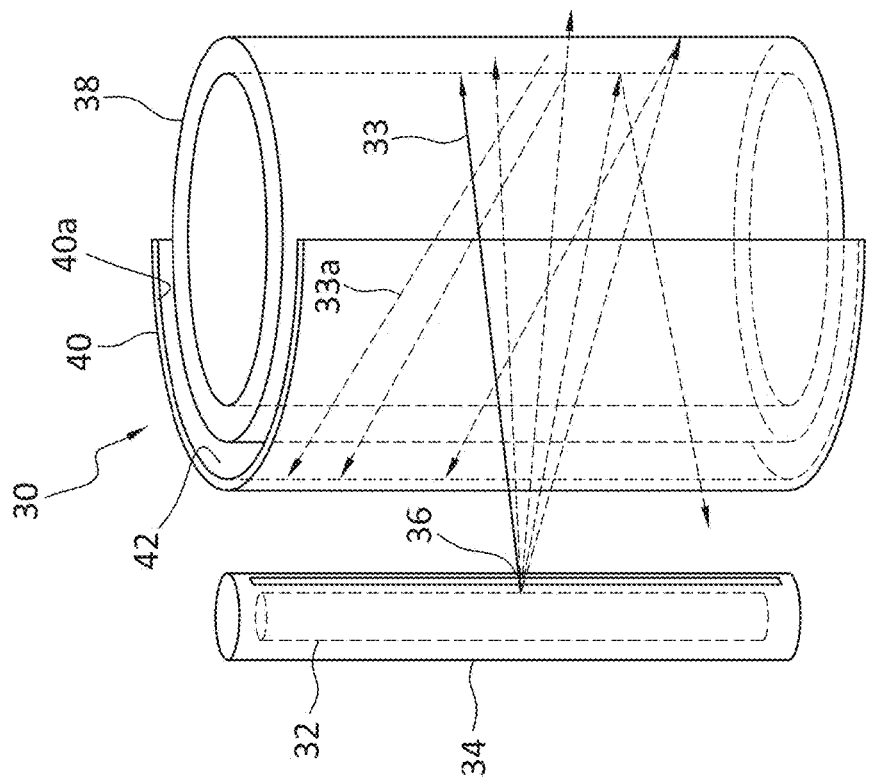
FIG. 2B
FIG. 2D
FIG. 2C
FIG. 2A

NON-DESTRUCTIVE INSPECTION METHODS, SYSTEMS AND APPARATUSES USING FOCUSABLE X-RAY BACKSCATTER DETECTORS

TECHNOLOGICAL FIELD

The present disclosure relates generally to the field of inspection systems and methods, including non-destructive inspection systems and methods. More specifically, aspects of the present disclosure relate to methods, apparatuses, and systems for indirectly detecting X-rays from an object using X-ray backscatter detection systems and methods.

BACKGROUND

Non-destructive inspection systems for evaluating substrates have found utility in industry, for example, where access to various components and substrate materials requiring routine service and inspection may be difficult to access without significant labor or without partially, or completely destroying the component or substrate material.

X-rays are a form electromagnetic radiation, typically having a wavelength ranging from 0.01 to 10 nanometers, corresponding to frequencies ranging from 30 petahertz to 30 exahertz ($3 \times 10^{16}$ Hz to $3 \times 10^{19}$ Hz) and energies in the range of 100 eV to 100 keV. X-ray backscatter systems are a type of X-ray imaging system using the indirect detection of X-rays to inspect a target object. X-ray backscatter systems typically comprise an X-ray tube, a collimator, and a detector. The X-ray tube generates and emits X-rays. The collimator filters the X-rays to form an X-ray beam using a portion of the X-rays that travel substantially parallel to a specified direction.

When the X-ray beam encounters the target object, some, or all of the X-rays in the X-ray beam are scattered by the target object in various directions. In particular, the X-rays may be scattered from the surface of the target object and/or from the sub-surface of the target object. The scattered X-rays are referred to as backscatter. When the backscatter impacts a detector, the detected X-ray backscatter can be used to generate image data for the target object being investigated. For example, the backscatter that is detected when the X-ray beam is directed at a particular location on, or within a particular target object can be used to generate an intensity value for a pixel in an image that corresponds to that particular location on or within the target object. The use of X-rays for non-destructive material evaluation allows inspection without destroying parts, components, substrates, etc. being inspected.

SUMMARY

According to one aspect, an apparatus is disclosed, with the apparatus including an X-ray radiation source configured to emit X-rays, with the X-rays configured to at least partially penetrate a target; a collimator in communication with the X-ray radiation source, with the collimator configured to form an X-ray beam using at least a portion of the X-ray radiation emitted by the X-ray radiation source, and wherein the X-ray beam is directed to the target. The apparatus further includes an X-ray backscatter detector, with the X-ray backscatter detector configured to detect X-ray backscatter formed in response to the beam encountering the target. The X-ray backscatter detector includes a flexible substrate, and at least one layer of X-ray scintillating material, with the layer of X-ray scintillating material configured to substantially cover the flexible substrate.

According to another aspect, the target comprises a target surface, with the target surface comprising a target surface geometry, and wherein the X-ray backscatter detector is conformable to the target surface geometry, including concave contours, convex contours, irregular contours, and other target geometries.

According to another aspect, an X-ray backscatter detector is disclosed, with the X-ray backscatter detector including a flexible substrate, and at least one layer of X-ray scintillating material configured to substantially cover the flexible substrate that is a one-piece flexible substrate.

In another aspect, the present application discloses a method including identifying a target, with the target having a target surface; positioning an X-ray backscatter apparatus proximate to a target. The X-ray backscatter apparatus includes an X-ray radiation source, a collimator, an X-ray backscatter detector, a flexible substrate, and at least one layer of X-ray scintillating material with the scintillating material configured to substantially cover the flexible substrate. The method further includes, orienting the X-ray backscatter detector to a predetermined geometry with the predetermined geometry substantially approximating the target surface geometry; and emitting the X-ray beam toward the target.

According to further aspects, disclosed methods further include detecting X-ray backscatter on the X-ray scintillating material.

According to further aspects, disclosed methods further include generating image data in response to the detected X-ray backscatter; forming a target image using the image data; and non-destructively inspecting the target.

In another aspect, the X-ray backscatter detector includes an X-ray radiation source configured to emit X-rays, with the X-rays configured to at least partially penetrate the target surface; a collimator in communication with the X-ray radiation source, with the collimator configured to form a beam using a portion of X-ray radiation emitted by the X-ray radiation source; an X-ray backscatter detector, with the X-ray backscatter detector configured to detect X-ray backscatter formed in response to the beam encountering the target. The X-ray backscatter detector includes a flexible substrate, and at least one layer of X-ray scintillating material, with the layer of X-ray scintillating material configured to substantially cover the flexible substrate.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 3:
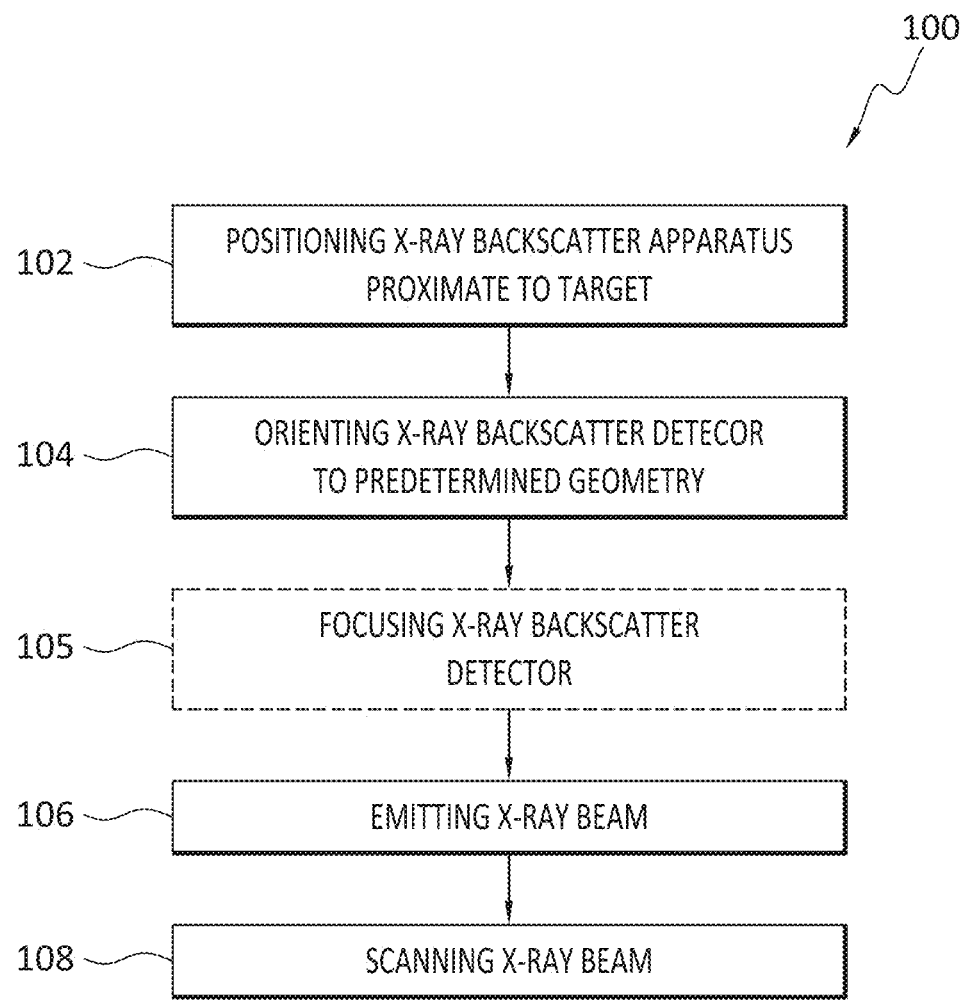

Having thus described variations of the disclosure in general terms, reference will now be made to the accompanying drawings, which are not necessarily drawn to scale, and wherein:

FIG. 1A is an overhead or "top" view illustration of an X-ray backscatter system according to a present aspect;

FIG. 1B is an enlarged view of the X-ray backscatter system, shown in FIG. 1A, and showing the substantially constant distance "d" between the detector and a target surface;

FIG. 2A is a perspective side-view illustration of an X-ray backscatter system shown according to a present aspect;

FIG. 2B is an overhead or "top" view illustration of the X-ray backscatter system shown in FIG. 2A, and according to present aspects;

FIG. 2C is an X-ray image of the target;

FIG. 2D is an X-ray image of the target;

FIG. 3 is a flowchart outlining a process according to present aspects; and

Figure 4:
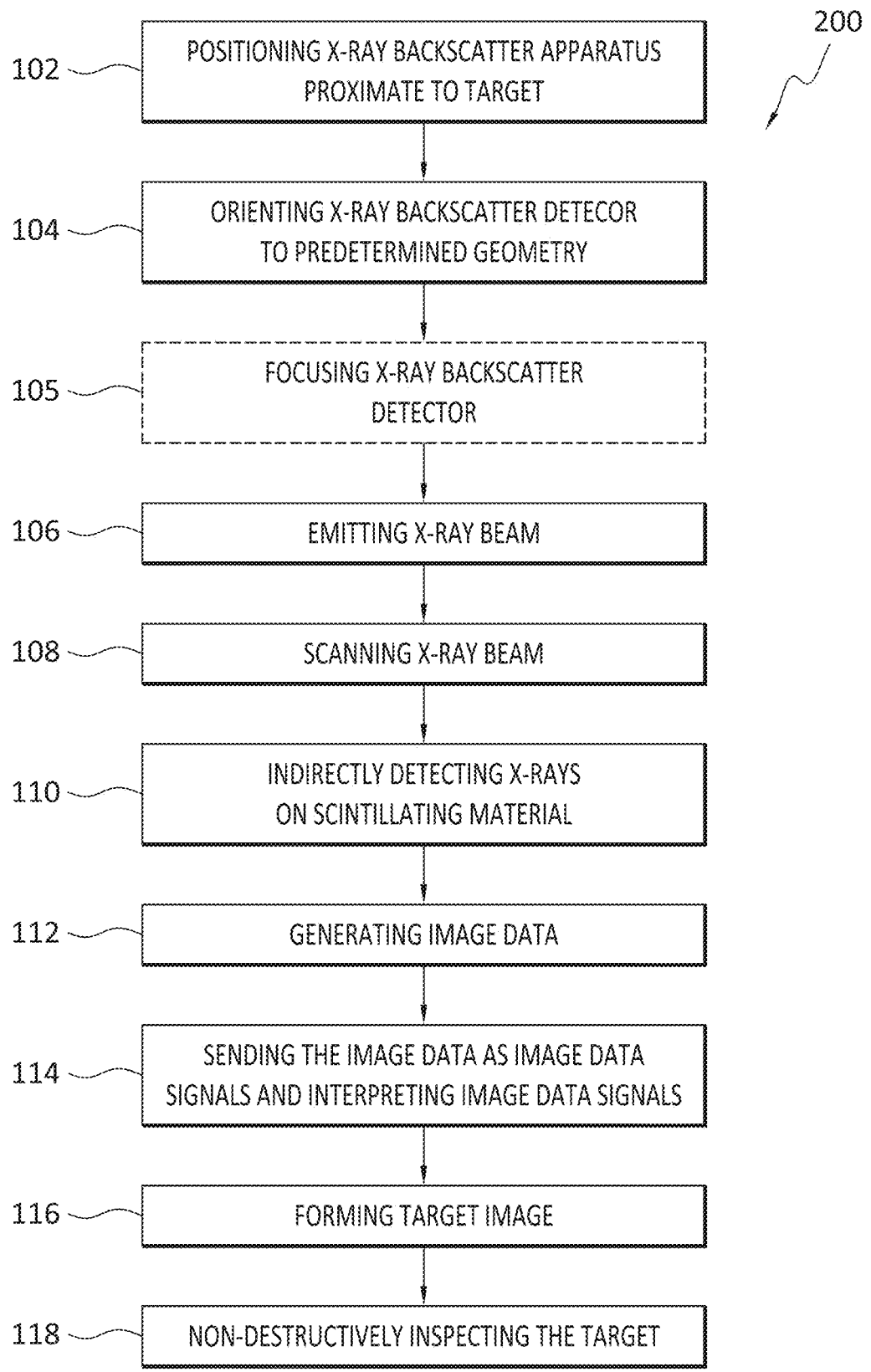

FIG. 4 is a flowchart outlining a further process according to present aspects.

DETAILED DESCRIPTION

X-ray backscatter analysis is a type of X-ray imaging that allows an evaluator to use X-rays to indirectly inspect an object by directing an X-ray beam at an object, and indirectly collecting X-ray backscatter as readings on a detection device, as the X-rays are scattered as "backscatter" from the target object. When signals generated from collected X-ray backscatter are interpreted via appropriate software, X-ray backscatter techniques can yield a viewable image of a region of target-object, for example, for the purpose of detecting flaws or otherwise characterizing a target object region such as, for example, a target object surface and/or a target object sub-surface. Depending on the shape of the target object, X-ray backscatter systems may not comprise adequate resolution for determining features of a target object. For example, images generated from signals generated by an X-ray detector and sent to an X-ray imaging system may not provide a desired contrast (e.g., images may not be sharp enough or clear enough) to enable one to reliably detect anomalies of a certain size that could cause a target object to fail inspection. Further, typical X-ray backscatter systems are typically large, cumbersome and use stationary detectors having a fixed focus with typically planar shapes for collecting X-ray backscatter from an object.

In a typical X-ray backscatter protocol, the X-ray beam can be moved relative to the target object in a selected pattern such as, for example, a raster patter, such that image data can be generated for different locations on or within the target object. The image data can then form one or more images that can be interpreted for determining whether inconsistencies, anomalies, defects, etc. reside in the locale of the target object inspected by the X-ray backscatter system The typical planar shape of X-ray backscatter detectors can limit the achievable contrast and overall usefulness of X-ray backscatter inspection regimes; for example, such as, and especially if the target object surface has a geometry that is other than planar. Redirected X-rays from a non-planar target surface have varied angles of incidence such that the amount of X-ray backscatter that is received by planar X-ray detector often fail to capture a requisite amount of reflected X-rays to yield useful image data, resulting in a lack of image detail including, for example, image sharpness, image contrast, etc.

Aspects of the present application disclose an X-ray backscatter detection system for non-destructively inspecting a target object, where the X-ray backscatter detector includes a substantially continuous (e.g., a one-piece) highly flexible and very thin flexible X-ray backscatter detector substrate including a deposited and substantially continuous scintillating layer covering the flexible substrate to form a highly flexible X-ray backscatter detector that can be oriented to, and maintained in a shape to complement a target geometry. The terms flexible X-ray backscatter detector and "flexible detector" are use equivalently and interchangeably herein.

According to further aspects, the presently disclosed apparatuses, systems, and methods incorporate a flexible X-ray backscatter detector that can be oriented or otherwise manipulated into a shape that approximates the profile of a target object. Such flexible X-ray backscatter detectors are focusable for the purpose of capturing an enhanced amount of scattered X-rays and significantly improving imaging characteristics that can be interpreted from imaging signals generated by the scintillating material that coats the presently disclosed flexible X-ray backscatter detectors.

The term "flexible", as used in the present disclosure, refers to a condition that is opposite to "rigid", and that connotes a condition where the flexible substrate can be deformed from a planar orientation and shaped and oriented into any practical shape or geometry without breaking, cracking, etc., or causing coatings on the flexible substrate to peel, flake, crack delaminate, etc., from the substrate surface onto which coatings are deposited. According to present aspects, the flexible X-ray detector substrates are continuous (e.g., one continuous piece, or have a one-piece configuration).

Scintillating layers comprising scintillating materials are deposited onto or otherwise incorporated into the flexible X-ray backscatter detectors. The scintillating materials absorb the backscattered X-rays and convert the X-ray radiation into visible light. Photodetectors present in the detectors that are sensitive to visible light convert the light from the scintillator into electric signals that are interpreted into visual images. Flexible scintillating coatings can be, for example, at least one thin continuous layer or layer of scintillating material. According to one present aspect, the scintillating layer can be printed onto a flexible X-ray backscatter detector, for example, by an additive manufacturing process such as, for example, ink-jet printing, etc.

The one-piece flexible X-ray backscatter detector substrate is made from materials, and is dimensioned, such that the X-ray backscatter detector is highly flexible, to the extent that the X-ray backscatter detector substrate comprising the scintillating material layer can be oriented and otherwise shaped into a desired non-planar geometry that, for example, complements, closely approximates, and/or substantially matches the geometry of the target object, including but not limited to the target object surface. The target geometry can include one or more of a non-planar geometry including, for example, a concave geometry, a convex geometry, an irregular geometry or geometries, a complex non-planar geometry, and combinations thereof, etc.

According to a present aspect, X-ray backscatter apparatuses, systems, and methods are disclosed that benefit from the present very thin, flexible, and preferably one-piece detector substrates that comprise a continuous thin layer of scintillating material, with the scintillating material substantially covering at least one surface of the flexible detector substrate. The presently disclosed X-ray backscatter detectors that include the flexible detector substrate and the scintillating material layer are selected and fabricated to a total flexible detector thickness preferably ranging from about 50 μm to about 100 μm.

According to present aspects, X-ray backscatter techniques, and the resolution and contrast of the X-ray backscatter imaging made possible through the use of the presently discloses methods, apparatuses, and systems, are significantly improved through the use of the present highly flexible, conformable, one-piece, and continuous X-ray backscatter detectors that can be shaped and maintained into a desired geometry that closely approximates and/or substantially matches the geometry of a target surface. The methods, systems, and apparatuses disclosed herein greatly improve non-destructive indirect X-ray inspection techniques, such as X-ray backscatter techniques for evaluating targets, including targets that are non-planar or that include non-planar target geometries. As used herein, the term "non-planar" in the context of "non-planar" surfaces, are defined as surfaces that have at least an area that is not entirely lying or able to be confined within a single plane. According to present aspects, such non-planar targets and target surfaces further include, in non-limiting fashion, geometries including: a concave geometry, a convex geometry, an irregular geometry, geometries comprising contour including complex contours, other complex geometries, and combinations thereof.

According to present aspects, the flexible X-ray backscatter detector substrate is can be made from a material such as, for example, an organic carbon-containing material, including, for example, polyethylene naphthalate, poly-4-vinylphenol, and combinations thereof.

According to present aspects, the scintillating material can be deposited onto the flexible X-ray backscatter detector substrate to achieve a scintillating material layer having an average thickness ranging from about 200 nm to about 50 µm. Still further, the scintillating material layer can be deposited onto the thin, flexible X-ray backscatter detector substrate, for example, via an additive manufacturing method for depositing thin films, including, for example, inkjet printing methods. When inkjet printing techniques are used to deposit the scintillating material onto the flexible substrates, the scintillating material is provided to an inkjet printer in the form of a scintillating inkjet printing ink. Any scintillating material that can be formulated into an inkjet print ink can be used to make the scintillating layer. Particularly preferred scintillating material layers can include, for example, inkjet printer deposited or "printed" formulations based on gadolinium oxide doped with europium ($Gd_2O_3:Eu^{3+}$); gadolinium oxysulfate (GdOS); cesium iodide (CsI), and calcium tungstate ($CaWO_4$).

Present aspects are illustrated in FIG. 1A. As shown in FIG. 1A, a non-destructive X-ray backscatter inspection system 10 comprises an X-ray radiation source 12 (that can be in the form of, for example, an X-ray tube) positioned within a collimator 14, with the collimator 14 having an aperture 16. In operation, In operation, as X-rays 13 are emitted from the X-ray radiation source 12 (that can be, for example, an X-ray tube), the collimator 14 rotates such that the aperture 16 changes position and directs emitted X-rays 13 to different positions on a target 18 to approximate or achieve a raster scan. Scattered X-rays 13a are directed back from a target 18 having a target surface 18a, and then impact the flexible X-ray backscatter detector 20 including a flexible X-ray backscatter detector substrate 20a having at least one scintillating material layer 22 deposited onto the X-ray backscatter detector substrate 20a. As shown in FIG. 1A, the flexible X-ray backscatter detector 20 has a non-planar geometry that closely approximates and/or substantially matches the non-planar geometry of the target 18. Flexible X-ray backscatter detector 20 comprises a layer of scintillating material (equivalently referred to herein as the scintillating material layer) 22 that receives the backscattered X-rays 13a. As shown in FIG. 1A, the flexible X-ray backscatter detector 20 as shown is non-planar, and the flexible X-ray backscatter detector 20 is in communication with a computer imaging system 24. The impact on the flexible X-ray backscatter detector 20 of the scattered X-rays 13a generate image data, for example, in the form of a image data signals 23 sent from the detector 20 to the computer imaging system 24, and the computer imaging system 24 transforms the image data signals 23 into a target image 26 for the purpose of non-destructively viewing and/or inspecting areas of the target 18.

As compared with a planar detector, according to present aspects incorporating a non-planar detector, the decrease in randomness of the angles of the backscattered X-rays 13a that are incident on the scintillating material layer 22 of the flexible X-ray backscatter detector 20 increases the accuracy, clarity, contrast, etc. of the target image 26 that is generated from the image data signals 23 sent from the detector 20 to the computer imaging system 24. Stated another way, without being bound by any particular theory, it is believed that reducing the range of variation of incident backscatter angles from a perpendicular angle of about 90° through the use of a non-planar X-ray backscatter detector that is flexible and can be shaped to closely approximate the geometry of a target, significantly improves the accuracy, clarity, contrast, etc. of the target image 26 that is generated from the from the image data signals 23 sent from the flexible X-ray backscatter detector 20 to the computer imaging system 24.

As further shown in FIG. 1A, the flexible X-ray backscatter detector 20 that comprises the layer of scintillating material 22 has been formed into a non-planar geometry that substantially approximates or otherwise substantially matches the non-planar geometry of the target outer surface 18a of the target 18. Though not necessarily shown in FIG. 1A, in the instance where a sub-surface or inner surface region of a target is being imaged, the detector comprising the scintillating material layer can be shaped into a desired geometry that will substantially approximate or otherwise substantially match the geometry of the sub-surface or inner surface region of the target region being imaged.

FIG. 1B is an illustration of an enlarged region 21 of the flexible X-ray backscatter detector 20 shown in FIG. 1A. As shown in FIG. 1B, region 21 more clearly shows that the scintillating layer 22 of flexible X-ray backscatter detector 20 is oriented (e.g., positioned) at a distance labelled as "d" from the target surface 18a of target 18. According to a present aspect, and as shown in FIG. 1B, distance "d" is substantially constant across the length and area of the flexible X-ray backscatter detector 20 relative to the target 18. In another aspect, the distance "d" is maintained as being substantially constant across the length and area of the flexible X-ray backscatter detector 20 relative to the target 18 throughout the duration of a non-destructive inspection using the presently disclosed apparatuses, systems, and methods. That is, according to present aspects, presently disclosed methods further include establishing a substantially constant distance between the layer of scintillating material (or between the flexible X-ray backscatter detector substrate, or between the detector itself) and the target surface across a length of the flexible X-ray backscatter detector. According to another aspect, presently disclosed methods further contemplate maintaining a substantially constant distance between the layer of scintillating material (or between the flexible X-ray backscatter detector substrate, or between the detector itself) and the target surface across a length of the flexible X-ray backscatter detector. The ability to orient the presently disclosed flexible X-ray backscatter detectors to a predetermined distance "d" from a target surface allows the detector to closely approximate or substantially match the geometry of the target surface. The predetermined distance "d" can be any distance as desired that allows for a maximum capture of X-ray backscatter from the target for the purpose of producing a desired degree of contrast and image sharpness of the images produced by the presently disclosed X-ray backscatter systems. For example, according to non-limiting aspects, the distance "d" can range from less than about 0.1 mm to about 5 cm or more. According to further non-limiting aspects, the distance "d" can, for example, range from about 0.1 mm to about 1 cm.

FIGS. 2A and 2B are representative diagrams of further present aspects, showing an X-ray backscatter apparatus where the flexible X-ray backscatter detector is proximate to, but need not contact, the X-ray radiation source. FIG. 2A is a cross-sectional view of a non-limiting portion of a non-destructive X-ray backscatter inspection apparatus 30 is shown, having a collimator 34 and an aperture 36 wherein a non-planar target 38 scatters inbound X-rays 33 from the X-ray radiation source 32 (that, for example, can be an X-ray tube, etc.) as backscattered X-rays 33a to the flexible X-ray backscatter detector 40 at backscatter X-rays 33a having incident angles that are closer to perpendicular (closer to a right angle or closer to about 90°) relative to the scintillating material layer 42 of flexible X-ray backscatter detector 40 (than would otherwise be the case if backscattered X-ray beams were incident on the surface of a planar detector. The one-piece flexible X-ray backscatter detector 40 including a flexible X-ray backscatter detector substrate 40a having at least one scintillating material layer 42 deposited onto the X-ray backscatter detector substrate 40a. As shown in FIG. 2A, the scintillating material layer 42 is positioned as the inner surface of the one-piece flexible X-ray detector 40 (e.g., the surface closest to the target). As shown in FIG. 2A, the position of the x-ray source (in contrast to the apparatus orientation shown in FIG. 1A) does not interrupt the unitary, or flexible X-ray backscatter detector 40, which is shown as one continuous and uninterrupted structure. FIG. 2B is an overhead view of the X-ray backscatter apparatus and system shown in FIG. 2A.

FIGS. 2C and 2D are X-ray photographs of target images 66a, 66b generated by a computer imaging system that interprets image data signals sent from the detector to the computer imaging system. Though not shown in FIG. 2A or 2B, the computer imaging system used in conjunction with and according to aspects shown in FIGS. 2A and 2B is contemplated as being a computer imaging system that is similar, for example, to that shown in FIG. 1A.

The present systems, apparatuses, and methods contemplate the incorporation of X-ray sources that can be commercially available, or that can be customized to further benefit the presently disclosed aspects. According to present aspects, the X-ray radiation sources can include conventional X-ray tubes, multi-focused X-ray tubes, etc.

According to present aspects, collimators associated with the X-ray radiation sources can have an aperture ranging from about 0.5 mm to about 2.0 mm, with the aperture range being modified, if desired, to further improve image resolution and otherwise tailor the present non-destructive inspection techniques, systems and apparatuses to generate the image data necessary to yield computer assisted target imagery having satisfactory resolution and contrast that is achievable using the presently disclosed flexible detectors.

Once the disclosed systems and apparatuses are initiated, and an X-ray beam is generated, and collimated or otherwise conditioned, and deployed to a target region ("target region" as used herein comprises at least one of: a t least a portion of the target surface area and/or at least a portion of a target sub-surface area), the presently disclosed flexible X-ray backscatter detector receives impacting (e.g., inbound) X-ray backscatter as X-ray backscatter that is incident on the scintillating material layer on the flexible X-ray backscatter detector. Because the flexible detectors that incorporate the flexible scintillating layer have a geometry that closely matches the target object geometry, a virtual point-for-point imaging capability results as concave, convex and irregularly shaped target surfaces scatter X-rays back to the scintillating layer such that point-by-point reading of the target improves resulting imaging contrast and reading of the target, as compared with the results obtainable through conventional X-ray backscatter techniques where planar detectors are employed.

According to present aspects, instead of bombarding entire regions of the target surface with X-rays that may not return to the detectors to be "read", the present apparatuses, systems, and methods, can emit a reduced, but targeted amount of emitted X-rays, but (because the detector geometry closely matches the target surface geometry) can insure that a desired and enhanced amount of X-ray backscatter is captured on the flexible scintillating layer of the flexible detector to produced enhanced imaging results, especially in terms of significantly improved contrast. That is, the present apparatuses, systems, and methods, can emit one-tenth ($\frac{1}{10}$) of the X-rays emitted in known systems that produce inferior imaging and contrast as compared with the presently disclosed systems. For example, via the raster scan approach used according to some present aspects, even a 1% return scatter of the total amount of emitted X-rays produces enhanced localized imaging and contrast, as the single point on the target surface scatters back predictably to the flexible scintillating layer on the flexible detector to produce data for the single point on the target surface that can be read significantly more accurately and clearly than the conventional "shotgun" backscatter approach that is known conventionally.

According to present aspects, the presentation of the detector being one unitary piece, or a "one-piece" detector eliminates the number of "dead zones" ordinarily present on X-ray backscatter detectors that are not one-piece detectors. This is because the scintillating layer on the one-piece detector represents a continuous layer that can receive incident X-ray backscatter particles across and throughout virtually the entire area of the detector. This is in strong contrast with known detectors where multiple sections of detector substrate material are joined together, potentially interrupting a continuous scintillating material layer. The ability to have a one-piece detector with a substantially continuous coating layer of scintillating material applied to the flexible, non-planar, detector substrate allows for the totality of the detector to be able to receive backscatter, and this enables the entire apparatus to capture an increased amount of X-ray backscatter that, in turn, creates an increased amount of imaging data that results in an interpreted image having greatly enhanced contrast and detail.

As the detector collects and records the photon energy and generates image data in the form of image data signals, according to further present aspects, the presently disclosed flexible detectors generate and send image data signals to computer imaging systems, such as those that are commercially available, or computer imaging systems that can be further modified.

Deposition of scintillating material layers onto the detector substrate material can be accomplished by any method that is able to deposit a substantially uniform scintillating material layer having an average thickness ranging from about 200 nm to about 50 µm. According to one present aspect, inkjet printing of the scintillating material can be accomplished by using, for example, a Dimitrix Materials Printer (DMP 2831 (Fujifilm Dimatrix, Inc.). In a preferred aspect, the inkjet printer can have a 16-nozzle piezoelectric printhead having a drop volume of about 10 pL and a spacing between nozzles of about 250 µm. Printing can be conducted with a maximum jetting frequency of about 5 kH.

According to present aspects, a useful polymer-based scintillating ink can be gadolinium oxide doped with europium ($Gd_2O_2:Eu^{3+}$) as a scintillating material. The scintillating material can be combined with a thermoplastic elastomer copolymer as a polymer matrix to produce a flexible scintillating ink with adhesive properties necessary to adhere to the flexible detector substrate. One useful thermoplastic elastomer copolymer includes, for example, styrene-ethylene/butylene-styrene (SEBS) Calprene CH-6120 (Dynasol, Houston, Tex.) having an average molecular weight of 245.33 g/mol and present in a ratio of ethylene-butylene: styrene of 68:32.

FIG. 3 is a flowchart outlining further non-limiting methods according to present aspects and including a method 100 comprising positioning 102 an X-ray backscatter apparatus proximate to a target. The target has a target surface geometry and the X-ray backscatter apparatus includes an X-ray radiation source configured to emit X-rays, a collimator in communication with the X-ray radiation source, and with the collimator configured to form a X-ray beam using at least a portion of the X-ray radiation emitted from the X-ray radiation source. The X-ray backscatter apparatus further includes an X-ray backscatter detector, with the X-ray backscatter detector configured to detect X-ray backscatter formed in response to the X-ray beam encountering the target. The X-ray backscatter detector includes a flexible X-ray detector substrate, that is preferably a continuous X-ray detector substrate and at least one layer of X-ray scintillating material configured to substantially cover the flexible X-ray detector substrate. The method further includes orienting 104 the X-ray backscatter detector to a predetermined detector geometry, with the predetermined detector geometry substantially approximating the target surface geometry. The method further includes emitting 106 an X-ray beam towards the target and scanning 108 the X-ray beam over the target. According to a further aspect, concurrent with, subsumed into, or following the step of orienting the X-ray backscatter detector to a predetermined detector geometry, a present method further includes focusing 105 the X-ray backscatter detector for the purpose of capturing the greatest amount possible of backscattered X-rays. The method illustrated generally in FIG. 3 is non-limiting and further is intended to include the apparatuses and systems presented in at least one of FIGS. 1A, 1B, 2A and/or 2B, for the purpose of producing the X-ray imaging shown in at least one of FIGS. 2C and/or 2D.

FIG. 4 is a flowchart outlining a further method according to another aspect. As shown in FIG. 4, method 200 includes the method steps presented in FIG. 3 above and in addition includes indirectly detecting 110 X-ray backscatter on a scintillating material layer of the X-ray backscatter detector, generating 112 image data; sending 114 the image data as image data signals to a computer that receives and interprets the image data signals, and forming 116 a target image, followed by non-destructively inspecting (118) the target. The method illustrated generally in FIG. 4 is non-limiting and further is intended to include the apparatuses and systems presented in at least one of FIGS. 1A, 1B, 2A and/or 2B, for the purpose of producing the X-ray imaging shown in at least one of FIGS. 2C and/or 2D.

The presently disclosed methods, systems, and apparatuses provide enhanced non-destructive inspection techniques on targets such as components and parts that are difficult to inspect and can be otherwise difficult to access. Such objects can include components and parts in vehicles as well as components and parts in stationary objects and systems including, for example, and without limitation, pipes used in pipelines, storage tanks, structural supports in buildings, bridges, railways, trusses, etc. Non-destructive inspection of vehicles and components in vehicles can include, for example, and without limitation, components and assemblies incorporated into manned and unmanned aircraft, manned and unmanned spacecraft, manned and unmanned rotorcraft, manned and unmanned terrestrial vehicles, manned and unmanned non-terrestrial vehicles, manned and unmanned surface water-borne vehicles and manned and unmanned sub-surface water-borne vehicles, and combinations thereof.

The presently disclosed aspects may, of course, be carried out in other ways than those specifically set forth herein without departing from essential characteristics of the presently disclosed aspects. The present aspects are to be considered in all respects as illustrative and not restrictive, and all changes coming within the meaning and equivalency range of the appended claims are intended to be embraced therein.

What is claimed is:

1. A method for non-destructively inspecting a target, the method comprising:

positioning a non-destructive X-ray backscatter inspection apparatus proximate to a target, said target having an exterior target surface, said exterior target surface having an exterior target surface geometry, said X-ray backscatter apparatus comprising:

an X-ray radiation source configured to emit X-ray beams, said X-ray beams configured to at least partially penetrate the exterior target surface;

a collimator in communication with the X-ray radiation source, said collimator configured to form a beam using a portion of X-ray radiation emitted by the X-ray radiation source;

a flexible X-ray backscatter detector, said flexible X-ray backscatter detector configured to detect X-ray backscatter formed in response to the beam encountering the target, said flexible X-ray backscatter detector comprising:

a one-piece flexible X-ray backscatter detector substrate; and at least one substantially continuous flexible X-ray scintillating material layer, said at least one substantially continuous flexible X-ray scintillating material layer configured to substantially cover the one-piece flexible X-ray backscatter detector substrate to form a substantially continuous flexible X-ray scintillating material coating layer on the one-piece flexible X-ray backscatter detector substrate;

orienting the flexible X-ray backscatter detector comprising the substantially continuous flexible X-ray scintillating material coating layer to a predetermined flexible X-ray backscatter detector geometry, said predetermined flexible X-ray backscatter detector geometry configured to substantially match the exterior target surface geometry, said predetermined flexible X-ray backscatter detector geometry conformable to the exterior target surface geometry to obtain a point-for-point imaging capability;
emitting an X-ray beam towards the target;
focusing the flexible X-ray backscatter detector to maximize an amount of X-ray backscatter returning to the flexible X-ray backscatter detector comprising the substantially continuous flexible X-ray scintillating material coating layer from the target and impacting the flexible X-ray backscatter detector comprising the substantially continuous flexible X-ray scintillating material coating layer;
establishing a substantially constant distance between the at least one substantially continuous flexible X-ray scintillating material coating layer and the exterior target surface across a length of the flexible X-ray backscatter detector comprising the substantially continuous flexible X-ray scintillating material coating layer;
scanning the X-ray beam;
detecting X-ray backscatter across the totality of the at least one substantially continuous flexible X-ray scintillating material coating layer;
generating image data in response to X-ray backscatter detected on the substantially continuous flexible X-ray scintillating material coating layer;
forming a target image using the image data; and
non-destructively inspecting the target.

2. The method of claim 1, further comprising:
indirectly detecting X-ray backscatter on the substantially continuous flexible X-ray scintillating material coating layer.

3. The method of claim 1, wherein the flexible X-ray backscatter detector substrate has a thickness ranging from about 50 nm to about 100 nm.

4. The method of claim 1, wherein the at least one substantially continuous flexible X-ray scintillating material coating layer has a thickness ranging from about 200 nm to about 500 nm.

5. A non-destructive X-ray backscatter inspection apparatus comprising:
an X-ray radiation source configured to emit X-rays;
a collimator in communication with the X-ray radiation source, said collimator configured to form a beam using at least a portion of the X-ray emitted by the X-ray radiation source, wherein the beam is directed to a target, said target comprising an exterior target surface, said exterior target surface comprising an exterior target surface geometry;
a flexible X-ray backscatter detector, said flexible X-ray backscatter detector configured to detect X-ray backscatter formed in response to the beam encountering the exterior target surface, said flexible X-ray backscatter detector conformable to the exterior target surface geometry to obtain a point-for-point imaging capability, said flexible X-ray backscatter detector comprising:
a one-piece flexible X-ray backscatter detector substrate comprising: at least one substantially continuous flexible X-ray scintillating material layer, said at least one substantially continuous flexible X-ray scintillating material layer configured to substantially cover a surface of the one-piece flexible X-ray backscatter detector substrate;
wherein the flexible X-ray backscatter detector is configured to maximize capture of an amount of X-ray backscatter returning to the flexible X-ray backscatter detector from the target and impacting the flexible X-ray backscatter detector across the totality of the X-ray backscatter detector; and
wherein the flexible X-ray backscatter detector is configured to establish a substantially constant distance between the at least one substantially continuous flexible X-ray scintillating material layer and the exterior target surface across the totality of the flexible X-ray backscatter detector.

6. The apparatus of claim 5, wherein the exterior target surface geometry comprises at least one of: a non-planar geometry; an irregular geometry; a contoured geometry, and combinations thereof.

7. The apparatus of claim 5, wherein said X-rays are configured to at least partially penetrate the exterior target surface.

8. The apparatus of claim 5, wherein the one-piece flexible X-ray backscatter detector substrate comprises an organic carbon-containing material.

9. The apparatus of claim 5, wherein the one-piece flexible X-ray backscatter detector substrate comprises at least one of: a carbon-based siloxane material; polyethylene naphthalate; poly-4-vinylphenol; and combinations thereof.

10. The apparatus of claim 5, wherein the one-piece flexible X-ray backscatter detector substrate has a thickness ranging from about 50 nm to about 100 nm.

11. The apparatus of claim 5, wherein the at least one substantially continuous flexible X-ray scintillating material layer comprises at least one of: gadolinium oxide doped with europium; gadolinium oxysulfate; cesium iodide; and calcium tungstate, and combinations thereof.

12. The apparatus of claim 5, wherein the at least one substantially continuous flexible X-ray scintillating material layer has a thickness ranging from about 200 nm to about 500 nm.

13. The apparatus of claim 5, wherein the at least one substantially continuous flexible X-ray scintillating material layer is configured to be deposited onto the flexible X-ray backscatter detector substrate.

14. The apparatus of claim 5, wherein the at least one substantially continuous flexible X-ray scintillating material layer comprises a printable scintillating inkjet printer ink.

15. The apparatus of claim 5, wherein the at least one substantially continuous flexible X-ray scintillating material layer is configured to be printed onto the one-piece flexible X-ray backscatter detector substrate.

16. The apparatus of claim 5, wherein the flexible X-ray backscatter detector comprises a flexible X-ray backscatter detector geometry, said flexible X-ray backscatter detector geometry configured to substantially conform to the exterior target surface geometry, and exterior target surface geometry is a non-planar target surface geometry.

17. The apparatus of claim 16, wherein the non-planar target surface geometry comprises at least one of: a concave geometry; a convex geometry, an irregular geometry, a contoured geometry; and combinations thereof.

18. A flexible X-ray backscatter detector for a non-destructive X-ray backscatter system, said flexible X-ray backscatter detector comprising:
a one-piece flexible X-ray backscatter detector substrate;
at least one substantially continuous flexible X-ray scintillating material layer, said at least one substantially continuous flexible X-ray scintillating material layer configured to substantially cover at least one surface of the one-piece flexible X-ray backscatter detector substrate to form a substantially continuous flexible X-ray scintillating material coating layer;

wherein in use the flexible X-ray backscatter detector is configured to maximize a capture of an amount of X-ray backscatter returning from a target to the flexible X-ray backscatter detector and impacting the flexible X-ray backscatter detector across the totality of the X-ray backscatter detector, said target comprising an exterior target surface, said exterior target surface comprising an exterior target surface geometry, said flexible X-ray backscatter detector conformable to the exterior target surface geometry to obtain a point-for-point imaging capability; and wherein in use the flexible X-ray backscatter detector is configured to establish a substantially constant distance between the substantially continuous flexible X-ray scintillating material coating layer and the exterior target surface across an entire length of the flexible X-ray backscatter detector.

19. The detector of claim 18, wherein the flexible X-ray backscatter detector substrate has a thickness ranging from about 50 nm to about 100 nm.

20. The detector of claim 18, wherein the at least one substantially continuous flexible X-ray scintillating material coating layer has a thickness ranging from about 200 nm to about 500 nm.

* * * * *